United States Patent [19]

Ogino

[11] Patent Number: 4,611,315
[45] Date of Patent: Sep. 9, 1986

[54] OPTICAL DISK APPARATUS AND TRACK ACCESS METHOD THEREFOR

[75] Inventor: Yasuo Ogino, Yokohama, Japan

[73] Assignee: Canon Kabushiki Kaisha, Tokyo, Japan

[21] Appl. No.: 682,233

[22] Filed: Dec. 17, 1984

[30] Foreign Application Priority Data

Dec. 20, 1983 [JP] Japan ................. 58-238945

[51] Int. Cl.⁴ .................. G11B 5/09; G11B 17/00
[52] U.S. Cl. ............................ 369/33; 360/78; 369/41
[58] Field of Search .............. 369/33, 41; 360/78

[56] References Cited

U.S. PATENT DOCUMENTS

| | | | |
|---|---|---|---|
| 4,310,861 | 1/1982 | Kashio | 360/78 |
| 4,480,279 | 10/1984 | Hashimoto | 360/78 |
| 4,481,613 | 11/1984 | Yokota | 360/78 |

Primary Examiner—Steven L. Stephan
Attorney, Agent, or Firm—Fitzpatrick, Cella, Harper & Scinto

[57] ABSTRACT

There is disclosed an optical disk apparatus provided with an optical pickup for recording or reproducing information by irradiating an optical disk with a light beam, a tracking device for causing the light beam to exactly follow a track formed on the optical disk, a driving mechanism for moving the optical pickup in the radial direction of the disk for track access, a circuit for outputting a signal representing the rotational position of the disk at the start and end of the track access, and regulating device for starting or terminating the track tracing operation of the tracking device in synchronization with a signal from the signal output circuit, and is also disclosed a track access method for enabling high-speed, precise track access without the influence of track eccentricity.

9 Claims, 6 Drawing Figures

OPTICAL DISK APPARATUS AND TRACK ACCESS METHOD THEREFOR

BACKGROUND OF THE INVENTION

1. Field of the Invention

The present invention relates to an optical disk apparatus and a method of track access therefor, and more particularly to an improvement in the method of track access for an optical disk apparatus equipped with an optical pick-up provided with means for tracking a track formed on an optical disk.

2. Description of the Prior Art

Generally in the optical disk apparatus, an optical disk is maintained in rotation and a light beam is projected thereon by recording or reproducing means including an objective lens, etc. (hereinafter called optical pickup) to record or reproduce information. The optical pickup is generally provided with tracking means for control in such a manner that said light beam always exactly traces on tracks a track which is formed on the optical disk and in which information is recorded or is to be recorded. In such apparatus there is conducted an operation of transferring the irradiating position of the light beam from a track currently under tracking to another target track on which information recording or reproduction is desired. This operation is hereinafter called track access.

At the track access in the conventional optical disk apparatus, at first the distance to the target track is determined by detecting the current position of the optical pickup by means of an external scale or by reading track address information recorded in advance on the track, and the optical pickup is moved in the radial direction of the optical disk according to said distance.

However, the rotation of the optical disk usually involves an eccentricity corresponding to several tens to several hundreds of tracks due to an error in the precision of a center hole in the disk manufacture or an error in mounting of the disk on a turntable for disk rotation. Consequently, in such track access method, the reached track may be different from the target track because of the above-mentioned eccentricity. In such case it becomes necessary to repeat the track access operation or to execute a "kick" operation, to shift the light beam to a neighboring track by pulse driving the tracking means several times to several tens of times toward the target track, and there is accordingly required a long access time.

On the other hand, in the Japanese Patents Laid-open No. 62837/1983 and No. 91536/1983 there is disclosed a method of track access without the external scale, by directly detecting and calculating the number and direction of tracks crossed by the light beam at the displacement of the optical pickup. This method is, however, unable to achieve exact track access because errors often occur in said detection or calculation by dust or scars on the optical disk.

SUMMARY OF THE INVENTION

The object of the present invention, therefore is to provide an optical disk apparatus and a track access method therefor, which are no longer associated with the drawbacks of the conventional technologies and enable high-speed and exact track access.

The above-mentioned object can be achieved according to the present invention by an optical disk apparatus comprising:

an optical pickup for information recording or reproduction by irradiating an optical disk with a light beam;

tracking means for controlling said light beam to exactly tracking a track formed on said optical disk;

driving means for displacing said optical pickup in the radial direction of said optical disk at the time of track access operation;

signal output means for releasing or outputting a signal indicating the information on the rotational position of said optical disk at the start and end of the track access operation; and regulating means for initiating or terminating the track access operation by said tracking means in synchronization with the signal from said signal output means.

Also the optical disk apparatus of the present invention performs a track access operation comprising:

a first step of tracking on a track on which the optical pickup is currently present;

a second step of terminating said tracking in synchronization with the information on the rotational position of the optical disk and shifting the optical pickup toward the target track; and a third step of initiating the tracking on the target track in synchronization with said information on rotational position of the optical disk.

DETAILED DESCRIPTION OF THE PREFERRED EMBODIMENTS

Now the present invention will be clarified in detail by embodiments thereof shown in the attached drawings.

Figure 1:
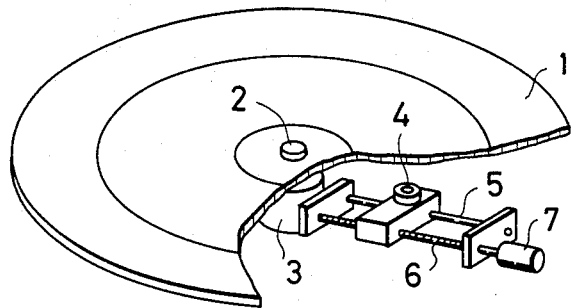
FIG. 1 is a partially cut-off perspective view of an essential part of the optical disk apparatus of the present invention.

FIG. 1 is a partially cut-off perspective view of the optical disk apparatus of the present invention.

In FIG. 1, an optical disk 1 is placed on a turntable 2 and is rotated by a driving motor 3. Opposed to the lower face of the optical disk 1 there is provided an optical pickup 4 which is supported by a guide rail 5 and a driving screw 6. Said optical pickup 6 moves in the radial direction of the optical disk 1 by rotation of said driving screw with a stepping motor 7.

Figure 2:
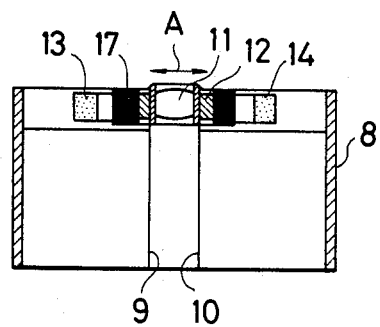
FIG. 2 is a vertical cross-sectional view along a line II—II in FIG. 3, showing a tracking actuator of the optical pickup shown in FIG. 1.
Figure 3:
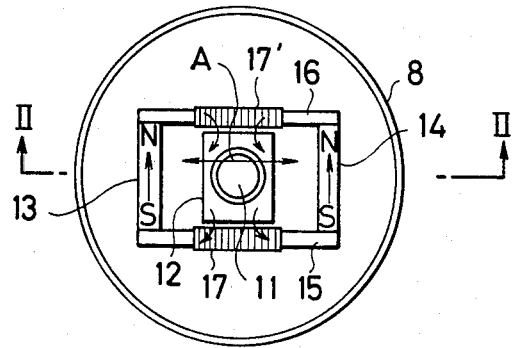
FIG. 3 is a plan view of the tracking actuator shown in FIG. 2.

FIG. 2 shows an example of a tracking actuator for the optical pickup shown in FIG. 1, and FIG. 3 is a plan view of said tracking actuator shown in FIG. 2.

In FIGS. 2 and 3, in a lens tube 8, an objective lens 11 is supported by a pair of plate springs 9, 10 so as to be movable in the radial or tracking direction, indicated by an arrow A in FIG. 2. A movable iron member 12 is affixed to said objective lens 11. In said lens tube and surrounding said movable iron member there are provided a pair of magnets 13, 14 and a pair of plates 15, 16 connected to both ends of said magnets at determined positions. Said magnets 13, 14 are rod-shaped and longitudinally magnetized as indicated in the illustration.

On said plates 15, 16 there are respectively wound tracking coils 17, 17' at such positions as to face said movable iron member 12 with a determined spacing to constitute magnetic circuits, for driving in the aforementioned tracking direction, through said plates 15, 16 as indicated by arrows in FIG. 3.

Thus, if currents of a same direction are supplied to said tracking coils 17, 17' in the presence of magnetic fields between the plate 15 and the movable iron member 12 constituting a magnetic circuit and between the other plate 16 and the movable iron member 12 constituting the other magnetic circuit as explained above in relation to FIGS. 2 and 3, there is generated a force in said tracking direction, i.e. in the lateral direction in FIGS. 2 and 3, in the parts of said coils present in said magnetic fields. However, since said tracking coils 17, 17' are fixed to the lens tube 8 of the optical pickup, the movable iron member 12 and the objective lens 11 affixed thereto are moved in said tracking direction as a reaction to the aforementioned force generated by the current supply. The above-described tracking actuator constitutes a tracking servo loop in combination with unrepresented tracking error detecting means. Thus, the objective lens is driven, according to a tracking error signal, to control the position of the light beam irradiating through said objective lens for information recording or regeneration in such a manner that said light beam always traces the track.

Figure 4:
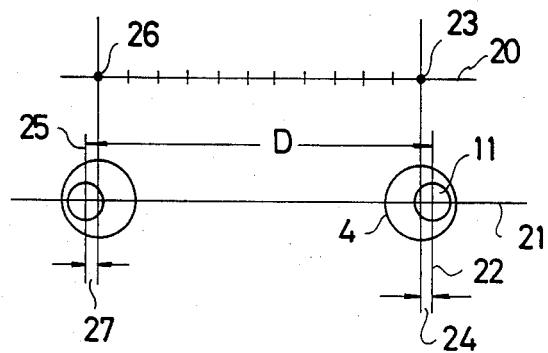
FIG. 4 is a schematic view graphically showing the principle of the track access method of the present invention.
Figure 5:
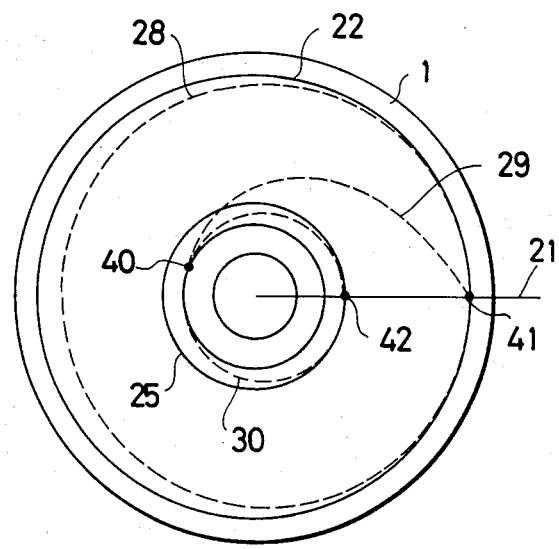
FIG. 5 is a schematic view showing the procedure of the tracking access on the optical disk according to the present invention.

FIGS. 4 and 5 show the function of the optical disk apparatus of the present invention at the track access.

In FIGS. 4 and 5 there are shown an external scale 20 having discrete outputs; a timing track 21 synchronized with the rotation of the optical disk; a track 22 currently traced by the objective lens 11; a current position 23 of the optical pickup; a deviation 24 of the currently traced track 22 with respect to the current position 23 of the optical pickup; a target track 25 for the track access; a position 26 of the optical pickup 4 after track access; and a deviation 27 of the target track 25 with respect to the position 26 of the optical pickup 4.

In FIG. 5, there are also shown a trajectory 28 of the center of the objective lens 11 when the tracking actuator is fixed at the aforementioned timing track 21 prior to the track access, and a trajectory 30 of the center of the objective lens 11 when the tracking actuator is fixed at said timing 21 after the track access. Thus said trajectories 28, 30 represent the relative eccentricity between the optical pickup 4 and the optical disk 1.

In FIG. 5 there is also shown a trajectory 29 in case of track access, at said timing track 21, from the currently traced track 22 to the target track 25.

In FIG. 4, a symbol D indicates the distance between the currently traced track 22 and the target track 25.

In the track access method of the optical disk apparatus of the present invention, as already suggested in FIGS. 4 and 5, the track access operation is started from a position 41 on the currently traced track 22 in synchronization with the timing track information 21 representing the rotational position of the optical disk 1. At the start of said track access operation, there are determined the deviation 24 of the currently traced track with respect to the position of the optical pickup, the distance D between the currently traced track 22 and the target track 25, the position 26 of the optical pickup closest to the target track, and the deviation 27 of the target track with respect to said pickup position, and the track access is conducted along the trajectory 29 according to these quantities, thereby displacing the optical pickup 4 to a position 40 corresponding to the target position 26 of the optical pickup on the external scale 20. Subsequently said deviation 27 is supplied to the tracking actuator to place the recording or regenerating position on the trajectory 30. The track access is terminated and the track tracing is initiated when the center of the objective lens 11 reaches, through said trajectory 30, a position 42 on the target track 25 at the timing track 21 representing the rotational position of the optical disk. The track access to the target track 25 can be achieved in this manner.

Figure 6:
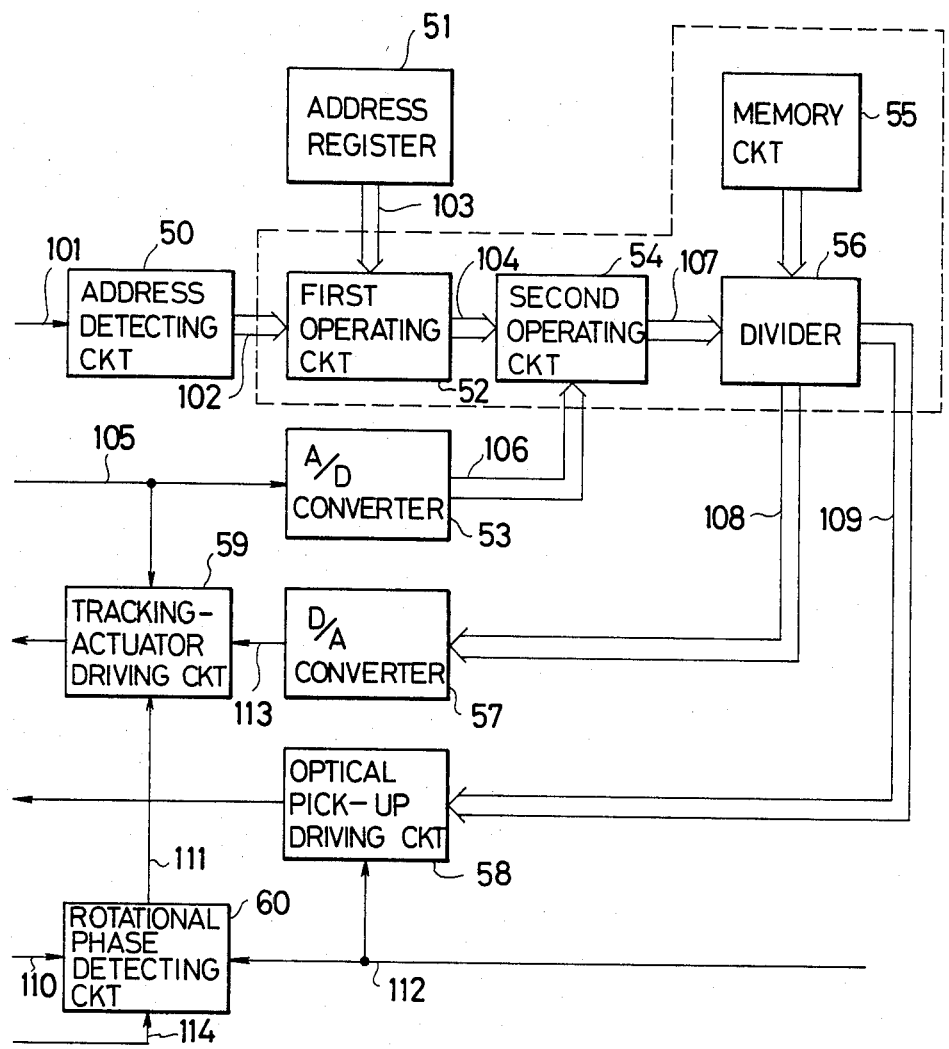
FIG. 6 is a block diagram of an apparatus adapted for executing the track access method of the present invention.

FIG. 6 is a block diagram of an example of the optical disk apparatus of the present invention adapted for executing the above-described track access method.

In FIG. 6 there are shown an address detecting circuit 50 for obtaining the address information of the currently traced track 22 from the signal regenerated therefrom; an address register 51 for temporarily storing the address of the target track 25; a first operating circuit 52 for determining the difference between the address of the currently traced track 22 and that of the target track 25; an A/D converter 53 for analog-to-digital conversion of the tracking error signal 105 to be supplied to a tracking actuator driving circuit 59; a second operating circuit 54 for subtracing said deviation 24 from the difference 104 between the addresses of the currently traced track 22 and the target track 25 to release a difference signal; a memory circuit 55 for storing the minimum resolving power of the external scale 20 having discrete output; and a divider 56 for dividing the above-mentioned difference signal 107 with the minimum resolving power (division) of the external scale 20 stored in advance in the memory circuit 55.

The quotient 109 obtained in said divider 56 corresponds to the distance from the position 23 of the optical pickup on the external scale 20 to the target position 26 thereof, while the residual 108 obtained in said divider 56 corresponds to the deviation 27 of the target track 25 (i.e. objective lens 11) with respect to the target position 26 of the optical pickup 4 on the external scale 20. Said quotient, obtained as an output of the divider 56, is supplied to the optical pickup driving circuit 58 for driving the optical pickup 4 according to the external scale 20, while said residual 108, obtained as the other output of the divider 56, is supplied to a D/A converter 57 for conversion into a signal 113 representing the deviation 27, which is supplied to the tracking actuator driving circuit 59.

In FIG. 6 there is also shown a rotational phase detecting circuit 60 which receives a start signal 112 from an unrepresented controller and an output signal 110 generated by a frequency generator (FG) directly connected to the disk driving motor 3 and representing the rotational status of the optical disk, counts the output signal of said frequency generator when triggered by a home position mark signal 114 formed on the optical disk, and stores the obtained count as the timing 21 in response to a track access start signal 112.

In the following there will be given an explanation on the procedure of the track access method of the present invention, to be executed in the apparatus shown in FIG. 6.

At first, immediately prior to the start of track access, the address detecting circuit 50 detects the address information of the currently traced track 22 from the regenerated signal 101, and the address data 102 obtained by said detection and the address data 103 of the target track 25 obtained from the register 51 are supplied to the first operating circuit 52 to determine, as an output signal 104, the difference D between the currently traced track 22 and the target track 25.

Simultaneously there is conducted the A/D conversion, by the A/D converting circuit 53, of the tracking error signal 105 to be supplied to the tracking actuator driving circuit 59, thus determining the deviation 24 of the currently traced track 22 with respect to the optical pickup 4 by means of the driving signal for the objective lens 11, and thus obtained deviation signal 106 is supplied together with the aforementioned difference 104 to the second operating circuit 54 to determine the difference therebetween.

The difference output signal 107 from said second operating circuit 54 is supplied to the divider 56 which divides said difference with the minimum division of the external scale 20 stored in advance in the memory circuit 55 to obtain the quotient 109 representing the distance from the position 23 of the optical pickup on the external scale 20 to the target position 26 thereof, and the residual 108 representing said deviation 27 of the center of the objective lens 11 with respect to the target position 26 of the optical pickup 4 on the external scale 20.

Said quotient 109 is supplied to the optical pickup driving circuit 58, while the residual 108 is supplied to the D/A converter 57.

The operation at the start of the track access is as follows.

The rotational phase detecting circuit receives the start signal 112 from the unrepresented controller and the output signal 110 generated by the frequency generator directly connected to the disk driving motor 3 and representing the rotational status of the optical disk, counts the output signal of said frequency generator when triggered by the home position mark signal 114 formed on the optical disk, and stores the obtained count as the timing 21 shown in FIG. 5, in response to the track access start signal 112. Simultaneously it supplies the signal 111 to the tracking actuator driving circuit 59.

In response to said signal 111 representing the rotational position of the optical disk, the tracking actuator driving circuit 59 interrupts the tracking servo operation, and, in response to the track access start signal 112, the driving circuit 58 for the stepping motor for driving the optical pickup 4 initiates the movement toward the target position 26.

The operation after the optical pickup 4 reaches the target position 26 is as follows.

Upon arrival of the optical pickup 4 at the target position 26, the tracking actuator driving circuit 59 receives the output signal 113 of the D/A converter 57 representing the deviation 27, and, in response thereto, displaces the objective lens 11 with respect to the lens tube 8 of the optical pickup. Thus the track access is initiated from the position 41 on the track 22 corresponding to the timing track 21 as shown in FIG. 5 and proceeds through the trajectory 29 to the position 40 corresponding to the position 26 of the optical pickup on the external scale 20. Subsequently the deviation 27 is added to the tracking actuator to effect the access through the trajectory 30 to the position 42 corresponding to said timing track 21, and, at this point the tracking actuator driving circuit 59 initiates the track tracing in response to the signal 111 from the rotational phase detecting circuit 60. The track access to the target track 25 is thus attained.

The detection of the rotational phase by the aforementioned rotational phase detecting circuit 60 is achieved by counting the output pulses of the frequency generator connected to the disk driving motor 3, after the release of the home position signal 114 obtained by detecting a home position mark on the optical disk with a photodetector. The position of detecting said home position signal is represented for example by a count zero.

In the foregoing embodiment, the deviation of the target track with respect to a target position on the external scale is detected at the start of track access, and is added at a timing synchronized with the start of track tracing, thus initiating the track tracing. Consequently in the track access method utilizing the external scale, it is rendered possible to achieve high-speed and precise track access without the influence of dusts or scars on the optical disk and without the influence of eccentricity of the track.

Though the optical disk apparatus and the track access method of the present invention have been explained by embodiments shown in FIGS. 4 to 6, the present invention is not limited to such embodiments but also is subjected to various modifications.

For example the aforementioned external scale 20 can be replaced by a combination of a potentiometer and an A/D converter or suitable optical means.

Also the stepping motor 7 for driving the optical pickup 4 may be replaced by a DC motor or a linear motor. Furthermore the tracking means is not limited to a mechanism for moving the lens but may be composed of any other known tracking means such as a tracking mirror.

Furthermore the procedure of track access is not limited to that explained in the foregoing. For example it is possible to terminate the tracking in synchronization with the information on the rotational position of the optical disk at the start of track access, to simultaneously hold the tracking signal, then to move the optical pickup by a distance D to the target track, and to initiate the tracking in synchronization with the information on the rotational position.

What is claimed is:
1. An optical disk apparatus comprising:
an optical pickup for recording or reproducing information by irradiating an optical disk with a light beam;
tracking means for controlling said light beam in such a manner that it exactly tracks a track formed on the optical disk;
driving means for moving said optical pickup in the radial direction of the optical disk;
means for outputting a signal representing the rotational position of the optical disk; and
regularing means for, at the time of track access, terminating the tracking operation by said tracking means to move the optical pickup by said driving means and for initiating the tracking operation at the same rotational position of the disk as that at which the tracking operation is terminated, according to the signal of said signal outputting means.

2. An optical disk apparatus according to claim 1, wherein said driving means comprises a driving source for the optical pickup, means for calculating the amount of displacement of the optical pickup for track access, and an optical pickup driving circuit for activating said driving source in responce to an output signal of said calculating means.

3. An optical disk apparatus according to claim 2, wherein said calculating means comprises means for determining the relative distance between a currently tracked track and a target track, means for determining the deviation of the currently tracked track from the position of the optical pickup, an operating circuit for determining the difference between said relative distance and said deviation and a divider for dividing said difference with the minimum resolving power of an external scale and supplying the obtained quotient to the optical pickup driving circuit.

4. An optical disk apparatus according to claim 3, wherein said relative distance determining means comprises an address detecting circuit for detecting the address of the currently tracked track from a reproduced signal, an address register for storing the address of the target track, and an operating circuit for determining the relative distance from the address data obtained from the address detecting circuit and from the address register.

5. An optical disk apparatus according to claim 3, wherein said deviation determining means comprises an A/D converter for A/D conversion of a tracking error signal.

6. An optical disk apparatus according to claim 3, wherein a signal representing the residual obtained in said divider is supplied, after D/A conversion, as the deviation of the target track from the position of the optical pickup, to said tracking means.

7. An optical disk apparatus according to claim 1, wherein said output means is adapted to store the timing of rotational position of the optical disk at the time of entry of the track access start signal and to output a signal at said timing.

8. An optical disk apparatus according to claim 7, wherein said output means comprises a rotational phase detecting circuit for counting the output signals of a frequency generator directly connected to an optical disk driving motor, when triggered by a signal corresponding to a home position mark formed on the optical disk.

9. A track access method for use in an optical disk apparatus equipped with an optical pickup provided with means for tracking a track formed on an optical disk, comprising:
a first step for tracking a track on which the optical pickup is currently present;
a second step for terminating said track tracking and moving said optical pickup to a target track; and
a third step for initiating the tracking of the target track at the same rotational position of the disk as that at which the track tracking is terminated.

* * * * *